US009803092B2

(12) United States Patent
Gutsch et al.

(10) Patent No.: US 9,803,092 B2
(45) Date of Patent: Oct. 31, 2017

(54) ELASTOMERIC BODY FOR VIBRATION DAMPING (71) Applicant: Carl Freudenberg KG, Weinheim (DE)

(72) Inventors: Michael Gutsch, Fuerth/Loerzenbach (DE); Martin Heber, Hennigsdorf (DE); Bjoern Hellbach, Birkenau (DE); Daniela Beyer, Pfinztal (DE); Thomas Schnetz, Schwetzingen (DE)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 15/031,286

(22) PCT Filed: Oct. 2, 2014

(86) PCT No.: PCT/EP2014/002697
§ 371 (c)(1),
(2) Date: Apr. 22, 2016

(87) PCT Pub. No.: WO2015/058834
PCT Pub. Date: Apr. 30, 2015

(65) Prior Publication Data
US 2016/0289463 A1    Oct. 6, 2016

(30) Foreign Application Priority Data
Oct. 24, 2013  (DE) .................. 10 2013 017 571

(51) Int. Cl.
| C08G 63/02 | (2006.01) |
| C09D 5/18 | (2006.01) |
| C08J 7/04 | (2006.01) |
| C08K 3/00 | (2006.01) |
| C09K 21/00 | (2006.01) |
| C08K 5/00 | (2006.01) |
| F16F 1/36 | (2006.01) |
| C09D 7/12 | (2006.01) |
| C09D 175/04 | (2006.01) |
| C08K 3/04 | (2006.01) |
| C08K 3/32 | (2006.01) |
| C08K 5/3492 | (2006.01) |

(52) U.S. Cl.
CPC .............. *C09D 5/185* (2013.01); *C08J 7/047* (2013.01); *C08K 3/0058* (2013.01); *C08K 5/0066* (2013.01); *C09D 7/1216* (2013.01); *C09D 7/1233* (2013.01); *C09D 175/04* (2013.01); *C09K 21/00* (2013.01); *F16F 1/3605* (2013.01); *C08J 2307/00* (2013.01); *C08J 2309/00* (2013.01); *C08J 2475/08* (2013.01); *C08K 3/04* (2013.01); *C08K 3/32* (2013.01); *C08K 5/34922* (2013.01); *C08K 2003/323* (2013.01)

(58) Field of Classification Search
CPC .............................. C08J 7/047; C09D 175/04
USPC ................................................... 528/176, 179
See application file for complete search history.

(56) References Cited

U.S. PATENT DOCUMENTS

| 2009/0309077 A1 | 12/2009 | Gupta et al. |
| 2010/0080920 A1 | 4/2010 | Lagrange et al. |
| 2011/0060064 A1 | 3/2011 | Heitmann |
| 2015/0203693 A1* | 7/2015 | Mestan ................. C08L 23/16 428/195.1 |

FOREIGN PATENT DOCUMENTS

| EP | 0835900 A2 | 4/1998 |
| EP | 1331242 A1 | 7/2003 |
| EP | 2088183 A1 | 8/2009 |
| EP | 2196492 A1 | 6/2010 |
| EP | 2260066 A1 | 12/2010 |
| JP | 2005088559 A | 4/2005 |
| JP | 2012052092 A | 3/2012 |
| WO | WO 2010034109 A1 | 4/2010 |

OTHER PUBLICATIONS

Hongfan Yang et al., "Effect of carbon black on improving thermal stability, flame retardancy and electrical conductivity of polypropylene/carbon fiber composites" Composites Science and Technology vol. 113, Jun. 5, 2015, pp. 31-37.*
Database WPI Week 200530, Thomson Scientific, London, GB; AN 2005-288690, XP002734210, pp. 1-4, Apr. 7, 2005.
Database WPI Week 201222, Thomson Scientific, London, GB; AN 2012-D22139, XP002734211, pp. 1-2, Mar. 15, 2012.

* cited by examiner

*Primary Examiner* — Terressa Boykin
(74) *Attorney, Agent, or Firm* — Leydig, Voit & Mayer, Ltd.

(57) ABSTRACT

An elastomeric body for vibration damping and/or suspension, has a base body and a flame-retarding coating which covers at least one section of the base body, wherein the flame-retarding coating has at least two intumescent fire protection systems and the first fire protection system contains expandable graphite which comprises at least a first fraction with an average grain size of more than 180 μm and at least a second fraction with an average grain size of less than 180 μm, and the second fire protection system forms a support structure in the expanded state, which structure at least partially fixes the expanded graphite in the expanded state.

22 Claims, 5 Drawing Sheets

ELASTOMERIC BODY FOR VIBRATION DAMPING

CROSS-REFERENCE TO RELATED APPLICATIONS

This application is a U.S. national stage application under 35 U.S.C. §371 of International Application No. PCT/EP2014/002697, filed on Oct. 2, 2014, and claims benefit to German Patent Application No. DE 10 2013 017 571.2, filed on Oct. 24, 2013. The International Application was published in German on Apr. 30, 2015, as WO 2015/058834 A1 under PCT Article 21(2).

FIELD

This application relates to flame-retardant elastomeric articles.

BACKGROUND

Organic materials, for example wood or paper, are generally combustible. This is also true, with a few exceptions, for the materials classed as plastics, i.e. materials based on synthetic or modified natural polymers.

Plastics are used in a wide variety of everyday applications. Plastics materials used in the construction and engineering sectors are in particular subject to specific requirements, which often include provision of adequate fire protection. The fire-protection criteria with which a plastic has to comply in a particular application are usually described in legislation, standards, and various other sets of regulations. Specific application-oriented fire-protection tests are used to demonstrate that a plastics material complies with the fire-protection requirements applicable to its application sector. Since plastics are generally combustible organic polymers, it is usually necessary to add flame retardant in order to pass the appropriate fire-protection tests.

There have hitherto been a variety of fire-protection specifications in the rail vehicle construction sector in Europe. The European Union has combined these by developing the European fire-protection standard EN 45545, ratified by CEN in March 2013; (the preliminary standard valid until that date having been CEN/TS 45545:2009). The German version was published as DIN EN 45545:2013 in August 2013.

All national standards relating to fire protection in rail vehicles have to be withdrawn by March 2016, and in future all plastics materials intended for use in rail vehicle construction have to comply with EN 45545:2013.

EN 45545 defines various product numbers: the product number covering cables for internal use is E1A, the product number covering cables for external use is E1B, and the product number covering flexible metal-rubber components, e.g. for vibration damping, is M1.

The nature and scope of fire-protection tests are defined in what are known as Requirement Sets applied to the various product numbers. By way of example, the tests for the abovementioned metal-rubber components with product number M1 are defined in Requirement Set R9 (R8 in CEN/TS 45545:2009).

The Requirement Sets moreover describe the results that have to be achieved in the prescribed fire tests in order to achieve classification in a particular hazard level. Hazard level 1 here represents the lowest level of requirements, while hazard level 3 is the most demanding level.

The hazard level achieved by a material or by the components produced therefrom then determines the specific design types and Operation Categories of vehicles in which it can be installed: if a component by way of example achieves hazard level 1 it can then be used only in design classes N, A, and D, and not S, for Operation Category 1 (and no other).

In contrast, components that achieve hazard level 3 can be used in all design classes and for all Operation Categories.

Vibration technology for rail vehicles is an application sector in which elastomeric materials are used. These likewise have to comply with the fire-protection requirements of DIN EN 45545:2013.

It is therefore of decisive importance for rail traffic that novel flame-retardant elastomer materials are found which comply with the requirements of the fire-protection standard DIN EN 45545:2013.

Flame retardants are usually dispersed homogeneously in the actual plastics material. However, this procedure is economically disadvantageous, because the flame retardants are primarily needed at the surface facing toward the seat of a fire—and are not needed, or are needed to a much lesser extent, in the interior of the plastics material. Another disadvantage resulting from homogeneous incorporation of flame retardants in plastics materials is that larger quantities, generally more than 10% by weight, of flame retardants are usually needed to achieve flame retardancy, and this substantially impairs the mechanical properties of the plastics system.

Another problem area also arises in the processing of elastomers, when comparison is made with thermoplastics, the forming process for which is a physical process: when elastomeric components are shaped it is desirable that a chemical reaction, termed vulcanization, takes place. Flame retardants that are incorporated into a compounded elastomer material can interfere in the vulcanization reaction with adverse results, and can impair processing properties or finished-part properties. They can also cause an undesirable reduction of the stability of what is known as the crude mixture in storage.

Provision of flame retardancy to a compounded elastomer material without coating, i.e. incorporation of all of the flame retardants into said material, therefore requires complicated experimentation, and the results will generally be applicable only to compounded materials of very similar type.

An approach that is significantly more efficient than homogeneous incorporation of a flame retardant is therefore application of a flame-retardant coating which localizes the flame retardants at locations where they are actually needed in the event of a fire. This approach can eliminate the disadvantages described above.

Flame-retardant coatings are likewise prior art. EP 2 196 492 discloses by way of example an elastomer body for vibration damping and springing, where the body comprises at least one layer of an elastic and flexible flame-retardant coating. The flame-retardant coating described in that document comprises expandable graphites as flame retardants.

Expandable graphites are intumescent flame retardant systems. These feature the ability to produce insulating barrier layers in the event of a fire. A plastics material coated with these materials can therefore be protected from the thermal decomposition due to a fire for a longer period of duration of the fire.

Expandable graphites or intumescent graphites are graphites that have been treated with strong acids and/or oxidants, for example sulfuric acid or potassium permanganate. The acids and/or oxidants here become intercalated between the layer planes of the graphite (intercalation), and thus disrupt the layer-lattice structure. On exposure to heat, the intercalated chemicals form gaseous products which force the individual carbon layers apart and lead to expansion of the individual graphite particles. The expansion volume here depends on the nature and quantity of the intercalated acid and of the oxidant, and in the event of a fire can be up to 400 times that of the original material.

The flame-retardant action of expandable graphites is based in essence on three effects. Firstly, expansion of the graphites consumes thermal energy, and thus cools the environment. Incombustible gases are moreover produced during expansion, and dilute the fire gases. Finally, the resultant insulation layers have high heat transfer resistance across a wide temperature range, insulating the material situated thereunder. Expandable graphites are among the most effective known flame retardants, and have already been used for more than 25 years in practical applications.

Expandable graphites are now used in a wide variety of application sectors, extending from coatings for steel beams and insulation-layer-forming systems for fire- and smoke-proof sealing of pipe ducts and cable ducts (EP 2 088 183 A1), and from foaming fire-protection tapes for security cabinets to flame-retardant foams for seats in aircraft or in rail vehicles (EP 2 260 066 A1).

EP 2 196 492 discloses an elastomer body for vibration damping and springing which comprises at least one layer of an elastic and flexible flame-retardant coating which comprises expandable graphites as flame retardants.

EP 2 196 492 also describes the results of fire-protection tests inter alia of CEN/TS 45545:2009, Requirement Set R8 (R9 in DIN EN 45545:2013). According to this Requirement Set, three fire-protection tests are carried out in accordance with the standards EN ISO 5659 (optical smoke density, smoke density, and toxicity) and, respectively, ISO 5660 (heat release rate).

The standard ISO 5660-1 describes a test relating to the fire behavior of construction materials where heat release rate is determined by the cone calorimeter method. The "average rate of heat emission" (ARHE) describes the average heat release rate, and is measured in kW/m$^2$. MARHE (maximum average rate of heat emission) describes the maximal value of average heat release, likewise stated in kW/m$^2$.

According to the prescribed requirement, for this abovementioned Requirement Set, the maximal permitted value determined in accordance with ISO 5660-1 for average heat release (MARHE) is at most 90 kW/m$^2$ for hazard level 1 and 2, and at most 60 kW/m$^2$ for hazard level 3.

The measured maximal value for average heat release (MARHE) stated for the flame-retardant-coated rubber described in EP 2 196 492 is 102 kW/m$^2$ for an irradiation power level of 35 kW/m$^2$. This flame-retardant-coated rubber does not therefore comply with Requirement Set R8 of CEN/TS 45545:2009, especially since the standard prescribes an irradiation power level of 50 kW/m$^2$.

EP 2 196 492 lacks information revealing whether the abovementioned coated rubber complies with the requirements in respect of smoke density and smoke toxicity.

There is therefore an urgent necessity to develop novel, flame-retardant elastomer materials, or coatings therefor, with which it is possible to pass the fire tests in accordance with DIN EN 45545.

SUMMARY

An aspect of the invention provides an elastomeric body for vibration damping and/or springing, the body comprising: a main body; and a flame-retardant coating which covers at least part of the main body, the flame-retardant coating including a first intumescent flame retardant system and a second intumescent flame retardant system, wherein the first flame retardant system includes expandable graphite including a first fraction with average grain size more than 180 µm, wherein the first flame retardant system includes expandable graphite including a second fraction with average grain size less than 180 µm, and wherein, in an expanded state, the second flame retardant system forms a supportive structure configured to at least partially fix the expandable graphite in the expanded state.

DETAILED DESCRIPTION

An aspect of the invention is achieved via an elastomeric body for vibration damping and/or springing, comprising at least a main body and a flame-retardant coating which covers at least one section of the main body, where the flame-retardant coating comprises at least two intumescent flame retardant systems, and the first flame retardant system comprises expandable graphite which has at least one first fraction with average grain size more than 180 µm, preferably from 180 µm to 800 µm, more preferably from 180 µm to 500 µm, and at least one second fraction with average grain size less than 180 µm, preferably from 50 µm to 180 µm, more preferably from 50 µm to 120 µm, and in particular from 70 µm to 90 µm;
 in the expanded state, the second flame retardant system forms a supportive structure which at least to some extent stabilizes and fixes the expandable graphite in the expanded state.

Practical experimentation has revealed that the elastomeric body of the invention provides excellent flame retardancy: the elastomeric body of the invention is capable, in the event of fire, of constructing an insulating barrier layer which can protect the body for a period of 20 minutes from damage due to the flames.

The elastomeric body of the invention moreover achieved hazard level 2 for the MARHE value and hazard level 3 for smoke density and smoke toxicity in Requirement Set R8 of DIN CEN/TS 45545:2009.

The elastomeric body of the invention features a specific combination of two different intumescent flame retardant systems. Intumescent (Latin: intumescere=swell) flame retardant systems, or insulation-layer-forming systems, are flame retardant systems which, in the event of fire, expand and form a voluminous, insulating protective layer.

The first flame retardant system comprises expandable graphite with at least two fractions of different average grain sizes, where the first fraction has average grain size more than 180 µm. An advantage of use of expandable graphite with large average grain size is that on expansion it undergoes a very large volume increase. It is thus possible to form a thick protective layer which can provide a long period of protection.

The second fraction of the expandable graphite has average grain size less than 180 µm. Use of this relatively small-particle graphite has the advantage that the small particles can close the gaps in the highly expanded structure of the large-particle graphite of the first fraction. The first flame retardant system is thus formed with a very dense structure, providing improved thermal insulation and improved robustness. Another advantage of this dense structure is that penetration of combustion through the flame-retardant coating, and a resultant fire involving the actual elastomers of the main body, can be rendered more difficult or prevented. Prevention of fire involving the actual elastomers is of great importance because it would contribute substantially to the release of hazardous smoke.

Another essential component of the flame-retardant coating is the second intumescent flame retardant system. In the invention this is selected in such a way that in the expanded state it forms a supportive structure which at least to some extent stabilizes and fixes the expandable graphite in the expanded state. This is advantageous in particular in respect of the greatly expanding graphite particles of the first fraction, because these would otherwise form, in the expanded state, a very loose structure with little coherence. In contrast, in the invention the large graphite particles are taken up into the structure of the second flame retardant system and stabilized in such a way as to permit formation of a stable flame-retardant layer.

The inventive use of the specific intumescent flame retardant system therefore permits provision of a comparatively large quantity of highly expandable graphite, for example from 5% by weight to 60% by weight, preferably from 10% by weight to 50% by weight, and particularly preferably from 15% by weight to 35% by weight, based on the total weight of the flame-retardant coating, and thus production of a flame-retardant coating which combines high thickness with adequate stability and robustness. High stability and robustness is of substantial importance because it allows retention of flame retardancy for a prolonged period even in adverse circumstances.

The proportion of expandable graphite in the second fraction is advantageously balanced with the quantity of graphite in the first fraction. An adequately dense structure is usually achieved with quantities from 5% by weight to 60% by weight, preferably from 25% by weight to 50% by weight, based on the total quantity of graphite in the flame-retardant coating.

The overall result is that the bodies of the invention which comprise graphite of various particle sizes feature not only high flame retardancy but also high stability and density.

Practical experimentation has revealed that elastomeric bodies with particularly good flame retardancy and stability can be obtained if the ratio of first particle size fraction to second particle size fraction is from 1.5 to 16, preferably from 4.0 to 10.0.

The overall result is that it has proven to be advantageous to adjust the proportion of expandable graphite in the flame-retardant coating to values from 10% by weight to 50% by weight, preferably from 15% by weight to 30% by weight, based on the total weight of the flame-retardant coating.

One preferred embodiment of the invention uses expandable graphite with onset temperature >160° C., preferably from 160° C. to 250° C. It is advantageous to use expandable graphite with high onset temperature because graphites of this type usually exhibit good expansion behavior. An example of a suitable graphite is sulfuric-acid-treated graphite. However, other embodiments can be expandable graphites based on acetic acid, on nitric acid, and/or on other organic or inorganic acids, and mixtures of these.

The second intumescent flame retardant system can be selected to be appropriate for the requirements placed upon the elastomeric body. It is essential that, in the expanded state, it is capable of forming a supportive structure which at least to some extent fixes the expandable graphite in the expanded state.

Practical experimentation has revealed that flame retardant systems comprising the following components achieve particularly good bonding of the expandable graphite:

an acid donor, preferably a phosphorus-containing flame retardant, for example red phosphorus, ammonium phosphate, ammonium polyphosphate (APP), phosphate esters of the general formula $P(O)OR_1OR_2OR_3$ (where $R_1$, $R_2$, and $R_3$ represent organic, branched or unbranched aromatic and/or saturated aliphatic and/or unsaturated aliphatic, and/or saturated cycloaliphatic and/or unsaturated cycloaliphatic, substituted and/or unsubstituted moieties having from 1 to 20 C atoms, and/or represent hydrogen atoms, where these can be different or identical) where these can be different or identical), phosphonates of the general formula $P(O)R_1OR_2OR_3$ (where $R_1$, $R_2$, and $R_3$ represent organic, branched or unbranched aromatic and/or saturated aliphatic and/or unsaturated aliphatic, and/or saturated cycloaliphatic and/or unsaturated cycloaliphatic, substituted and/or unsubstituted moieties having from 1 to 20 C atoms, and/or represent hydrogen atoms, where these can be different or identical), phosphinates of the general formula $P(O)R_1R_2OR_3$ (where $R_1$, $R_2$, and $R_3$ represent organic, branched or unbranched aromatic and/or saturated aliphatic and/or unsaturated aliphatic, and/or saturated cycloaliphatic and/or unsaturated cycloaliphatic, substituted and/or unsubstituted moieties having from 1 to 20 C atoms, and/or represent hydrogen atoms, where these can be different or identical), phosphoramidates of the general formula $(R_1O)(R_2O)PONR_3R_4$ (where $R_1$, $R_2$, $R_3$, and $R_4$ represent organic, branched or unbranched aromatic and/or saturated aliphatic and/or unsaturated aliphatic, and/or saturated cycloaliphatic and/or unsaturated cycloaliphatic, substituted and/or unsubstituted moieties having from 1 to 20 C atoms, and/or represent hydrogen atoms, where these can be different or identical), and phosphordiamidates of the general formula $(R_1O)PO(NR_2R_3)(NR_4R_5)$ (where $R_1$, $R_2$, $R_3$, $R_4$, and $R_5$ represent organic, branched or unbranched aromatic and/or saturated aliphatic and/or unsaturated aliphatic, and/or saturated cycloaliphatic and/or unsaturated cycloaliphatic, substituted and/or unsubstituted moieties having from 1 to 20 C atoms, and/or represent hydrogen atoms, where these can be different or identical). Examples of typical representatives of the abovementioned phosphorus compounds are by way of example trioctyl phosphate, tricresyl phosphate, triphenyl phosphate, ethylenediamine diphosphate (EDAP), cresyl diphenyl phosphate, 2-ethylhexyl diphenyl phosphate, tris(2-ethylhexyl) phosphate, triethyl phosphate, dimethyl propanephosphonate;

a carbon donor, in particular a polyhydric (tri-, tetra-, penta-, hexahydric and of higher hydricity), unbranched or branched, aliphatic or alicydic alcohol, as for example pentaerythritol and/or starch; and/or trimethylolpropane, preferably pentaerythritol.

a blowing agent, in particular a nitrogen-containing flame retardant such as in particular melamine, melamine derivatives (salts with organic or inorganic acids such as boric acid, cyanuric acid, phosphoric acid, or pyro/polyphosphoric acid), and melamine homologs such as melam, melem, and melon.

The combinations described above made of flame retardants exhibit excellent fire behavior because of their intumescent action and synergistic effects. It is particularly advantageous to utilize synergies between phosphorus-containing and nitrogen-containing flame retardants, for example ammonium polyphosphate (APP) and melamine cyanurate.

The intumescent action of these systems is based on the synergy between an acid-forming material, a carbon donor, and a blowing agent. The combined effect of acid-forming material and blowing agent has proven to be particularly advantageous here. In one preferred embodiment of the invention, the second intumescent flame retardant system therefore comprises at least one acid-forming material and at least one blowing agent.

In one preferred embodiment of the invention, the second intumescent flame retardant system comprises polyurethane as binder, at least one acid-forming material, at least one blowing agent, but no carbon donor, or only a small quantity of less than 5% by weight of a carbon donor, preferably less than 2.5% by weight. Surprisingly, it has been found in the invention that use of a carbon donor can be omitted if the coating comprises a polyurethane, in particular a polyether polyurethane as binder. Without adopting any mechanism in the invention, it is believed that this is possible because, as described in the section below, in the event of a fire the ammonium polyphosphate releases polyphosphoric acid, which extracts the oxygen in the form of water from the oxygen-rich polyether polyurethane and thus leads to formation of carbon, without any need for additional carbon donors.

The chemical processes leading to formation of an insulation layer in the event of a fire can be described as follows: the acid-forming material is thermally cleaved by the thermal energy of the fire, and releases an inorganic acid. Phosphorus-containing flame retardants, for example ammonium polyphosphate (APP), usually function as acid-forming materials which in the event of a fire release polyphosphoric acid.

The free polyphosphoric reacts with the carbon donor, usually a polyhydric alcohol such as pentaerythritol or starch, in that it extracts water therefrom and thus leads to formation of carbon.

Simultaneously with the carbonization process, the blowing agent, usually a nitrogen-containing flame retardant, also undergoes thermal decomposition, thus producing gaseous decomposition products which lead to blowing of the carbon as it forms and thus form an insulating carbon foam.

However, it is also conceivable that the second intumescent flame retardant system comprises nanocomposites, in particular phyllosilicates based on aluminum silicate clay minerals, for example bentonite, vermiculite, or montmorillonite, and mixtures thereof.

The proportions of the respective components are advantageously balanced with the nature and quantity of the expanding graphite, and in particular here selected with consideration of the proportion of graphite of the first particle size fraction. Good results are usually obtained when the proportion of acid donor is from 20% by weight to 80% by weight, preferably from 30% by weight to 70% by weight, based on the total quantity of the second intumescent flame retardant system, and/or the proportion of carbon donor is from 10% by weight to 40% by weight, preferably from 15% by weight to 35% by weight, based on the total quantity of the second intumescent flame retardant system, and/or the proportion of blowing agent is from 10% by weight to 40% by weight, preferably from 15% by weight to 35% by weight, based on the total quantity of the second intumescent flame retardant system.

By virtue of the good fire properties of the inventive body, it is not necessary that the flame-retardant coating also comprises other flame retardants alongside the intumescent flame retardant systems. It is nevertheless conceivable that the flame-retardant coating comprises other flame retardants, for example selected from the group consisting of mineral flame retardants, for example aluminum hydroxide (ATH) or magnesium hydroxide (MDH), or boron-containing compounds, for example borates, in order to achieve a still further increase in the flame-retardant action of the coating.

Another substantial advantage of the inventive elastomeric body is that it has low smoke toxicity. By virtue of the good fire properties of the inventive body, it is specifically possible to omit use of halogen-containing flame retardants and antimony trioxide, which are critical in respect of smoke toxicity. It is further advantageous that in the event of fire almost no critical gases are released from the expandable graphite: the acids used for the production of the graphite were found to have been firmly bonded in the structure thereof, and only very small quantities of said acids were found to escape in the event of a fire.

Particularly good smoke toxicity values are achieved when the second intumescent flame retardant system uses phosphorus-containing acid donors in combination with nitrogen-containing blowing agents. No gases of any kind are released from the phosphorus-containing acid donors in the event of a fire. The nitrogen-containing blowing agents release nitrogen and ammonia in the event of a fire. However, release of these gases is not critical, because nitrogen is an inert gas and ammonia burns with atmospheric oxygen to give nitrogen and water vapor. Possible residual quantities of ammonia present can be neutralized by the small quantities of acidic gases released from the expandable graphites. There is therefore synergy between the components used in the flame retardant systems, the overall effect of which is to give excellent smoke toxicity values.

The proportions of the flame retardants in the elastomeric body are advantageously adjusted in such a way that the total of the quantities of all of the flame retardants in the coating is from 10 to 70% by weight, based on the total weight of the coating.

The thickness of the coating can vary, depending on the desired property profile of the elastomeric body and on its particular use. In principle the flame retardancy increases as the thickness of the coating increases. However, the space required by the coating also increases here. Practical experimentation has revealed that a good compromise between flame retardancy and space required is obtained with coatings of average thickness from 1 mm to 6 mm, preferably from 2 mm to 4 mm.

It is advantageous for the coating to comprise a binder to bond the components of the flame-retardant coating to one another and to the elastomeric body. Said binder is preferably selected in such a way that the elastic properties of the elastomeric body are as far as possible retained. Good results are obtained with binders selected from the group consisting of polyacrylate, polyethylene, polypropylene, polyamide, polyester, polyurethane, ethylene-vinyl acetate, polyvinyl acetate, polyvinyl chloride, polyvinyl alcohol, and copolymers of these, and silicone.

The main body itself can comprise a very wide variety of elastomeric materials. It is advantageous that the main body comprises one of the following polymers: BR, ENR, HNBR, IIR, IR, NBR, NR, SBR, XNBR, ACM, AEM, EPDM, EVM (polymer terminology in accordance with ISO 1629:1995), and/or mixtures thereof.

In one embodiment of the invention, the main body is composed of an elastomeric body covered at least to some extent, but preferably entirely, by the flame-retardant coating. In another embodiment of the invention, the main body is composed of a plurality of smaller bodies. The smaller bodies here can be composed of elastomeric and/or non-elastomeric materials, for example metals, in particular steel and/or aluminum.

The invention also provides a process for the production of the inventive elastomeric body comprising the following steps:

production and/or provision of a suspension comprising a first intumescent flame retardant system comprising expandable graphite which has at least one first fraction with average grain size more than 180 µm, and at least one second fraction with average grain size less than 180 µm, and a second intumescent flame retardant system which, in the expanded state, forms a supportive structure which at least to some extend fixes the expandable graphite in the expanded state;

application of the suspension to at least one section of the surface of an elastomeric main body, thus providing a flame-retardant coating to the body.

The elastomeric body of the invention can be used in the gasket sector, for example in the form of O-rings. It is likewise suitable for the production of bellows, of hoses with or without textile reinforcement, and of membranes with or without textile reinforcement. Practical experimentation has revealed that the inventive body moreover has excellent suitability for the production of components for vibration damping and/or springing in particular in rail vehicle construction. The invention is explained in more detail below with reference to a number of examples.

Example 1: Production of an Elastomeric Body

A test sheet of elastomer made of 60 NR 511, a compounded material based on natural rubber with carbon black as reinforcing additive and with sulfur-based vulcanization system, is rendered flame-retardant by a coating. The coating is composed of a mixture of 100 parts by weight of Impranil DLU (60% polyurethane dispersion), 7.5 parts by weight of ammonium polyphosphate, 2.5 parts by weight of melamine, and 10 parts by weight of NORD-MIN 351 expandable graphite, and 10 parts by weight of NORD-MIN 95. A doctor is used to apply the aqueous mixture to the rubber, and said mixture is hardened at 80° C. This gives a compact, elastic coating which in the event of a fire intumesces and forms an insulation layer.

The suitability of the flame-retardant coating described above was tested in accordance with DIN CEN/TS 45545-2:2009 by determining firstly the heat release rate by the cone calorimeter method in accordance with ISO 5660-1:2002 and secondly smoke toxicity in accordance with EN ISO 5659-2:2007. The heat release rate determined for the flame-retardant coating described above was a MARHE value of 80.91 kW/m$^2$ for irradiation at 50 kW/m$^2$. This value complies with the fire-protection requirements for hazard level 2 in accordance with DIN CEN/TS 45545-2:2009. The following data were measured for smoke density and toxicity for irradiation at 50 kW/m$^2$: $D_s$=14, VOF4=27, $D_{max}$=111, $CIT_G$ (4 min)=0.05, $CIT_G$ (8 min)=0.1. The values comply with the fire-protection requirements for hazard level 3 in accordance with DIN CEN/TS 45545-2:2009.

Example 2: Production of an Elastomeric Body

An O-ring made of an elastomer based on EPDM with carbon black and precipitated silica as reinforcing additive and dicumyl peroxide as crosslinking agent is completely sheathed by a coating of the composition revealed in example 1.

Figure 1:
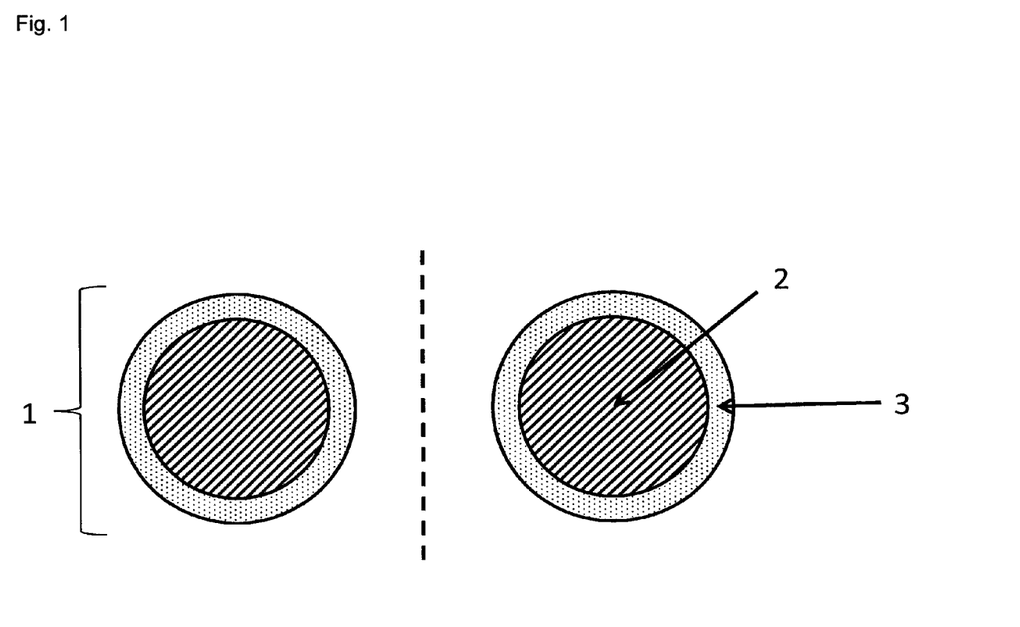

FIG. 1 shows by way of example the cross section of an elastomeric body (1) in the form of an O-ring or of a scroll spring. The circular main body (2) is completely covered by the flame-retardant coating (3).

Example 3: Production of an Elastomeric Body

A coating of the composition revealed in example 1 is provided to the external side of a bellows and hoses with and without textile reinforcement made of an elastomer based on polychloroprene rubber.

Figure 2:
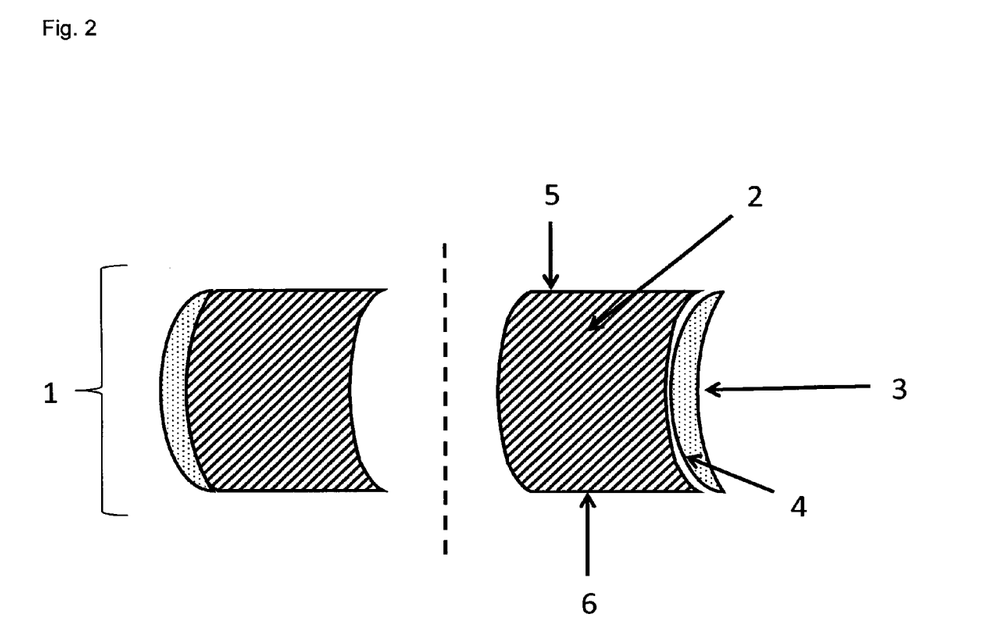

FIG. 2 shows by way of example the cross section of an elastomeric body (1) in the form of a bellows. The main body (2) is covered on the external area (4) by the flame-retardant coating (3), while the upper side (5) and the underside (6) are uncoated.

Example 4: Production of an Elastomeric Body

A coating of the composition revealed in example 1 is provided to part or all of vibration dampers made of an elastomer based on natural rubber, synthetic rubber, butadiene rubber, styrene-butadiene rubber, and blends thereof.

Figure 3:
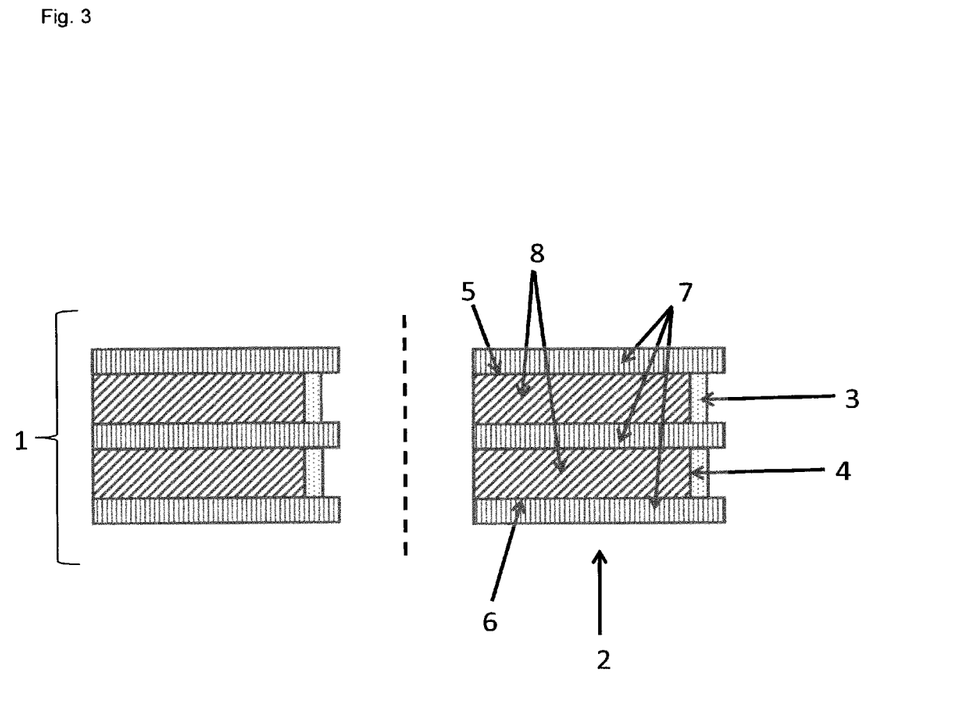

FIG. 3 shows by way of example the cross section of an elastomeric body (1) in the form of a laminate spring. In this embodiment the main body (2) comprises five smaller bodies (7, 8). The smaller bodies (7) are formed by metallic sheets. The smaller bodies (8) are composed of elastomeric materials. The smaller bodies (8) are covered on the external areas (4) by flame-retardant coatings (3).

Example 5: Production of an Elastomeric Body

A coating of the composition revealed in example 1 is provided to the external side of membranes with and without textile reinforcement made of an elastomer based on polychloroprene rubber.

Example 6: Production of an Elastomeric Body

A round bearing made of an elastomer is manufactured. A coating of the composition revealed in example 1 is provided to part thereof.

Figure 4:
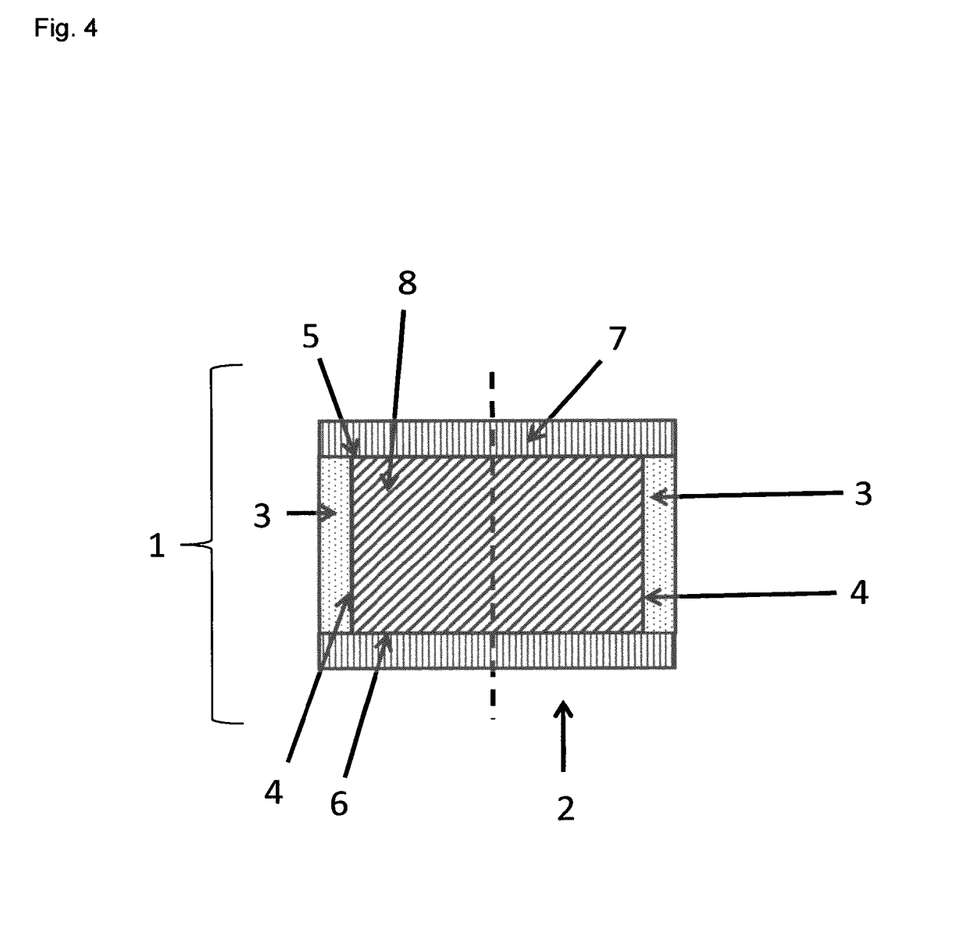

FIG. 4 shows by way of example the cross section of an elastomeric body (1) in the form of a round bearing. In this embodiment the main body (2) comprises three smaller bodies (7, 8). The smaller bodies (7) are formed by metallic sheets. The smaller body (8) is composed of elastomeric materials. The smaller body (8) is covered on the lateral area (4) by a flame-retardant coating (3).

Example 7: Production of an Elastomeric Body

A conical bearing made of an elastomer is manufactured. A coating of the composition revealed in example 1 is provided to part thereof.

Figure 5:
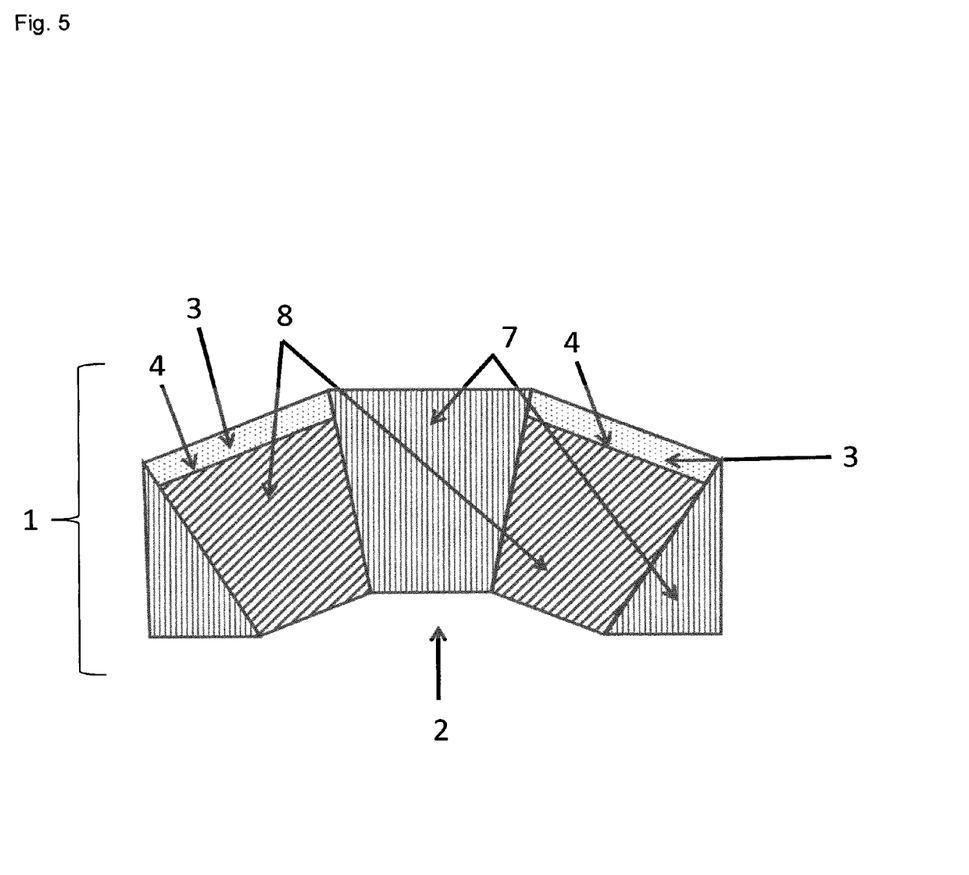

FIG. 5 shows by way of example the detail of a cross section of an elastomeric body (1) in the form of a conical bearing. In this detail the main body (2) comprises three smaller bodies (7, 8). The smaller bodies (7) are composed of metallic materials. The smaller bodies (8) are composed of elastomeric materials. The smaller bodies (8) are covered on the external areas (4) by flame-retardant coatings (3).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

The invention claimed is:

1. An elastomeric body for vibration damping and/or springing, the body comprising:
   a main body; and
   a flame-retardant coating which covers at least part of the main body, the flame-retardant coating including a first intumescent flame retardant system and a second intumescent flame retardant system,
   wherein the first flame retardant system includes expandable graphite including a first fraction with average grain size more than 180 μm,
   wherein the first flame retardant system includes expandable graphite including a second fraction with average grain size less than 180 μm, and
   wherein, in an expanded state, the second flame retardant system forms a supportive structure configured to at least partially fix the expandable graphite in the expanded state.

2. The body of claim 1, wherein a proportion of the expandable graphite in the flame-retardant coating is from 5% by weight to 60% by weight, based on a total weight of the flame-retardant coating.

3. The body of claim 1, wherein a proportion of the first fraction of the expandable graphite is from 40% by weight to 95% by weight, based on a total quantity of graphite in the flame-retardant coating.

4. The body of claim 1, wherein a proportion of the second fraction of the expandable graphite is from 5% by weight to 60% by weight, based on a total quantity of graphite in the flame-retardant coating.

5. The body of claim 1, wherein the second intumescent flame retardant system comprises:
   an acid donor;
   a carbon donor; and
   a blowing agent.

6. The body of claim 1, wherein the second intumescent flame retardant system comprises a mixture of ammonium polyphosphate (APP) and melamine cyanurate.

7. The body of claim 1, wherein a proportion of acid donor in the second intumescent flame retardant system is from 20% by weight to 80% by weight, based on a total quantity of the second intumescent flame retardant system, and/or
   a proportion of carbon donor in the second intumescent flame retardant system is from 10% by weight to 40% by weight, based on a total quantity of the second intumescent flame retardant system, and/or
   a proportion of blowing agent in the second intumescent flame retardant system is from 10% by weight to 40% by weight based on a total quantity of the second intumescent flame retardant system.

8. The body of claim 1, wherein the second intumescent flame retardant system comprises nanocomposites.

9. The body of claim 1, wherein the flame-retardant coating comprises no halogen-containing flame retardants.

10. A process for the production of the body of claim 1, the method comprising:
    producing and/or providing a suspension comprising the first intumescent flame retardant system comprising the expandable graphite including the first fraction with average grain size more than 180 μm, and the second fraction with average grain size less than 180 μm, the suspension further comprising the second intumescent flame retardant system which, in the expanded state, forms the supportive structure configured to at least configured to at least partially fix the expandable graphite in the expanded state; and
    applying the suspension to at least part of the surface of the main body, thus providing the flame-retardant coating to the body.

11. A method of producing a component for vibration damping and/or springing, the method comprising including the body of claim 1 in the component.

12. The body of claim 1, wherein the first fraction has an average grain size in a range of from more than 180 μm to 500 μm.

13. The body of claim 1, wherein the second fraction has an average grain size in a range of from 50 μm to less than 180 μm.

14. The body of claim 1, wherein the proportion of the expandable graphite in the flame-retardant coating is from 10% by weight to 50% by weight.

15. The body of claim 1, wherein a proportion of the first fraction of the expandable graphite is from 50% by weight to 75% by weight, based on a total quantity of graphite in the flame-retardant coating.

16. The body of claim 1, wherein a proportion of the second fraction of the expandable graphite is from 5% by weight to 60% by weight, based on the total quantity of graphite in the flame-retardant coating.

17. The body of claim 5, wherein the acid donor comprises a phosphorus-comprising flame retardant.

18. The body of claim 5, wherein the acid donor comprises red phosphorus, ammonium phosphate, ammonium polyphosphate, a phosphate ester of formula $P(O)OR_1OR_2OR_3$, a phosphonate of formula $P(O)R_1OR_2OR_3$, a phosphinate of formula $P(O)R_1R_2OR_3$, a phosphoramidate of formula $(R_1O)(R_2O)PONR_3R_4$, a phosphordiamidates of formula $(R_1O)PO(NR_2R_3)(NR_4R_5)$, or a mixture of two or more of any of these, wherein $R_1$, $R_2$, $R_3$, $R_4$, and $R_5$ are independently hydrogen or a organic, branched or unbranched aromatic and/or saturated aliphatic and/or unsaturated aliphatic, and/or saturated cycloaliphatic and/or unsaturated cycloaliphatic, substituted and/or unsubstituted moiety comprising from 1 to 20 C atoms.

19. The body of claim 5, wherein the carbon donor comprises a polyhydric alcohol.

20. The body of claim 5, wherein the blowing agent comprises a nitrogen-containing blowing agent.

21. The body of claim 1, wherein the main body has a different composition than the coating.

22. The body of claim 1, wherein the main body and the coating, taken together, include no more than 10 wt. % flame retardants, and the coating includes flame retardants in a range of from 10-70 wt. %, based on a total weight of the coating.

* * * * *